May 19, 1970 RICHARD C. CHU ET AL 3,512,582

IMMERSION COOLING SYSTEM FOR MODULARLY PACKAGED COMPONENTS

Filed July 15, 1968

INVENTORS
RICHARD C. CHU
UN-PAH HWANG
JOHN H. SEELY
BY Frank H. Sweeney Jr.
ATTORNEY United States Patent Office 3,512,582
Patented May 19, 1970

3,512,582

IMMERSION COOLING SYSTEM FOR MODULARLY PACKAGED COMPONENTS

Richard C. Chu, Un-Pah Hwang, and John H. Seely, Poughkeepsie, N.Y., assignors to International Business Machines Corporation, Armonk, N.Y., a corporation of New York Filed July 15, 1968, Ser. No. 744,862
Int. Cl. F28d *15/00;* H01l *1/12*
U.S. Cl. 165—105 7 Claims

ABSTRACT OF THE DISCLOSURE

A vessel containing a low-boiling-point liquid has a plurality of modular units connected thereto so that the auxiliary cooling chamber included in each modular unit is filled with the low-boiling-point liquid. Each auxiliary chamber contains heat generating components which are cooled by the low-boiling-point liquid in which nucleate boiling takes place. A separate heat exchanger located in each auxiliary chamber removes the heat from the low-boiling-point liquid. The vessel provides the common venting, degassing and pressure for the individual cooling chambers.

This invention relates to an improved immersion cooling system and, more particularly, to an immersion cooling system which affords greater flexibility in packaging of the electronic components to be cooled.

With the miniaturization capabilities afforded by the discovery of solid state electronics, various improved means of dissipating the heat generated by solid state components have been investigated. The standard forced air convection means appears to have reached its limits of practicality in that the amount of air that is required to provide efficient cooling introduces a noise problem and without some auxiliary techniques cannot maintain each of a large number of components within its critical, narrow operating temperature range. Accordingly, especially in connection with large scale computer systems, various combinations of air-liquid cooling systems have been devised. One of the more recent systems investigated has been the immersion cooling system, wherein the array of components to be cooled is immersed in a tank of cooling liquid. The liquids used are the new fluorcarbon liquids which have a low-boiling point. These liquids are dielectric and give rise to various types of boiling at relatively low temperatures. The mode of boiling and consequently the heat transfer is dependent on the heat flux at the surface interface between the component to be cooled and the cooling liquid. For a small heat flux which causes a temperature below the boiling point of the liquid, natural convection will take place. As the heat flux increases the temperature beyond the boiling point of the liquid, nucleate boiling will take place. The nucleate boiling causes the vaporization of the fluid immediately adjacent the hot component. As the vapor bubbles form and grow on the heated surface, they cause intense microconvection currents. Thus, nucleate boiling gives rise to an increase in convection within the liquid and, accordingly, improves the heat transfer between the hot surface and the liquid. As the temperature or heat flux increases, the nucleate boiling increases to the point where it or the number of bubbles increases to the point where they begin to coalesce and heat transfer by vaporization predominates. These modes of boiling or heat transfer have proven to be very efficient. However, there are problems in servicing and packaging components which are cooled using these techniques.

It will be appreciated, that the components to be cooled in an immersion type cooling system are not readily available for servicing. Either the liquid must be drained from the tank holding the liquid in which the components are immersed or the entire array of components must be disconnected and removed from the cooling liquid. The servicing is further complicated by the fact that the cooling liquids are very volatile and are easily contaminated. For example, these low-boiling-point liquids readily absorb air and, therefore, must be degassed before any initial operation or after any subsequent exposure to air.

It will also be appreciated that the packaging of the heat generating components is somewhat limited since the components must all be immersed in a large tank of the low-boiling-point liquid.

The main object of the present invention is to provide an immersion type cooling system which affords greater packaging flexibility.

It is another object of the present invention to provide an improved cooling system in which individual modules can be serviced without affecting the operation of other modules in the system or contaminating the cooling liquid.

Briefly, an improved immersion cooling system for modularly packaged components is provided comprising a common vessel containing a low-boiling-point liquid. A plurality of modular units, each containing an individual cooling chamber, are connected to the common vessel by respective input and output conduit means. The individual cooling chambers and the input conduit means are arranged with respect to the common vessel such that the liquid will flow from the vessel thru the input conduit into the individual cooling chambers by gravitational force. The output conduit means provides the vent path and liquid expansion path for the respective cooling chambers. Heat generating components are located in each of the cooling chambers in heat exchange contact with the low-boiling-point liquid so as to provide cooling. A heat exchanger is provided associated with each of the individual cooling chambers for removing heat from the low-boiling-point liquid so as to provide sufficient cooling to maintain said electronic components substantially at a predetermined temperature.

The foregoing and other objects, features and advantages of the invention will be apparent from the following more particular description of a preferred embodiment of the invention, as illustrated in the accompanying drawings.

Figure 1:
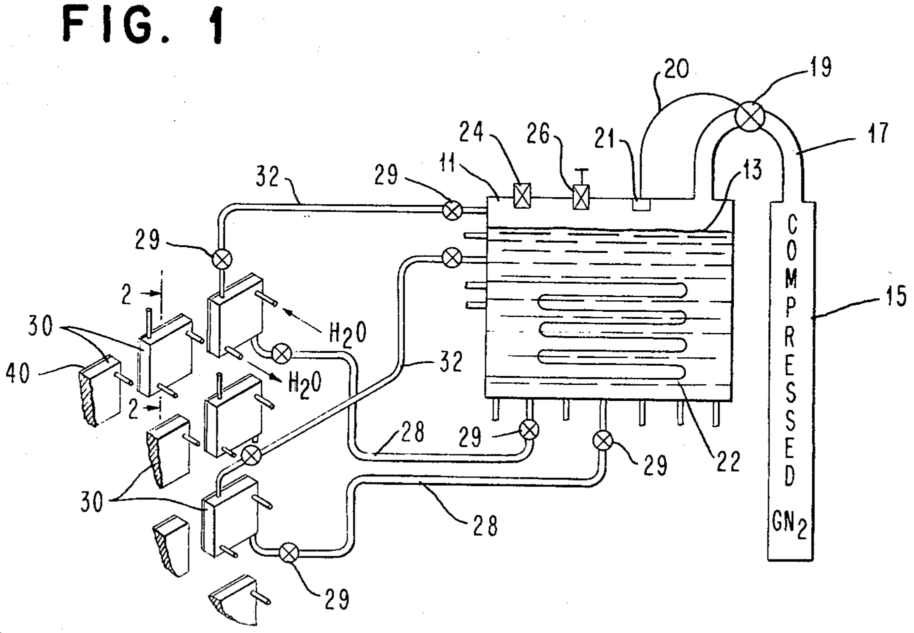
FIG. 1 is a partly perspective schematic view of the improved immersion cooling system for modularly packaged components of the present invention.

Referring to FIG. 1, there is shown a vessel or container 11 which contains a cooling liquid 13. The vessel 11 is a sealed container, the contents of which are maintained under an essentially constant pressure provided by the compressed gas source 15. The compressed gas is connected to the vessel by means of a conduit 17 containing a valve 19. Within the chamber, pressure sensitive device 21 provides the control for the valve 19 via the feedback connection 20. Thus, the vessel is an isobaric or constant pressure vessel. The liquid 13 contained within the vessel 11 is a low-boiling-point liquid such as one of the fluorcarbon liquids. These liquids are dielectric and have a low-boiling-point at or around atmospheric pressures. The low pressure is maintained in vessel 11 so as to maintain the boiling point at a fixed temperature since a change in pressure affects the temperature at which boiling takes place. The liquid 13 is easily contaminated especially by air. Accordingly, it is necessary to purge the excess absorbed air from the liquid 13 before usage. This is accomplished by a heating coil 22 which is immersed in the liquid in the vessel 11. Raising the temperature of the liquid 13 by means of the heating coil 22 reduces the air solubility in the liquid and, accordingly, the excess air contained in the liquid is purged. A one-way relief valve 24 is located at the top of the vessel 11 so that the air purged from the liquid 13 may escape fro mthe sealed vessel 11. One-way valves are well known and allow the air or gas to pass through in one direction only. Once the excess air is purged from the liquid 13, the gas from the compressed gas source can be applied to establish the predetermined low pressure for the system. A manual valve 26 is also provided in the top of the vessel 11 to relieve the pressure below that which is obtainable with the automatic one-way valve in the event it is necessary to depressurize the system. The vessel 11 is connected by a pair of conduits 28, 32 to a number of respective modular units 30. The conduits 28, 32 each contain valve means 29 for stopping the flow of liquid 13 between the vessel 11 and the modular units 30. The conduit 28 is connected between the bottom of the vessel 11 and the bottom of the modular unit 30. A further conduit 32 is shown connected between the top of each of the modular units and the top of the vessel 11. The connection to the vessel 11 is preferably above the liquid level. This conduit serves as a venting line for the modular unit so that it may fill with liquid from the vessel 11 by means of the input conduit 28 and the air contained therein may be vented through the output conduit 32. The ultimate venting, of course, is provided by the one-way relief valve 24 in the vessel 11. Thus, it can be seen that the vessel 11 is common to each of the modular units 30 and provides a number of services for each. For instance, vessel 11 provides the liquid for each of the modular units. It also is utilized as an expansion tank for each of the units. In the event that there is a small leak somewhere in the system, the liquid loss is compensated for by the reservoir of liquid contained in vessel 11, thus the liquid content of the modular units is maintained constant. As previously mentioned, the pressure maintained in vessel 11 establishes the pressure for the entire system. The degassing provided by means of the heater element 22 and the one-way relief valve 24 in the top of the vessel 11 also provides the degassing for the various modular units 30. It will be appreciated, that the individual connection of each of the modular units 30 to the vessel 11 provides a means of individually servicing each of the modular units without interrupting the operation of the other modular units in the system. This merely requires to closing of the valve means in the input conduit 28 and the output conduit 32 connecting the respective modular unit to the vessel 11. Once these valves are closed, the modular unit can be removed and serviced, etc. without interrupting the operation of the other modular units. It should be noted, that the vessel 11 is located with respect to the modular units 30 so as to provide gravity feed of the liquid 13. Therefore, a pumping means for the liquid is avoided. It will be appreciated that the modular units 30 can be located in a number of different arrangements other than that shown in FIG. 1. Thus, the system affords considerable flexibility in packaging of the modular units. The large two-dimensional array of the modular units 30, as shown in FIG. 1, affords easy accessibility to each of the modular units and is probably the simplest packaging arrangement.

The modular units 30 contain a board 40 upon which the components 41 to be cooled are mounted. The components 41 are arranged in a vertical two-dimensional array of columns and rows. It is important in operation that the components are maintained in vertical columns to obtain the most efficient cooling. The board 40 forms one wall of the modular unit 30 with the component carrying side facing inward. The outer facing side of the board 40 contains wiring and connecting means for the board mounted components 41. Each of the modular units 30 consists of a chamber 42 into which the conduits 28, 32 are directly connected. Thus, the chamber 42 is filled with the low-boiling-point liquid 13 supplied by the vessel 11. The chamber 42 is bounded by the board 40, previously described, an opposite parallel wall 45 and top and bottom walls 46 and 47, respectively. A heat exchanger 44 is located within the chamber 42 of each modular unit. The heat exchanger 44 is made of a good heat conducting material for conducting heat from the low-boiling-point liquid in which it is immersed in each chamber 42. The heat exchanger 44 also contains fins 50 extending from one surface thereof toward the components 41 to be cooled. These fins 50 provide more surface area for contact with the low-boiling-point liquid and thus improve the heat transfer therebetween. The heat is carried from the heat exchanger 44 by means of chilled water 52 which is supplied thereto from a separate source. The water 52 is circulated through the heat exchanger 44 to carry away the heat absorbed thereby. As shown, the water inlet and outlet for the heat exchanger passes thru the wall 45 of the modular unit chamber 42. The water 52 circulation means is not shown since it is immaterial to the invention and consists essentially of a pump and heat exchange means such as a water chiller.

Figure 2:
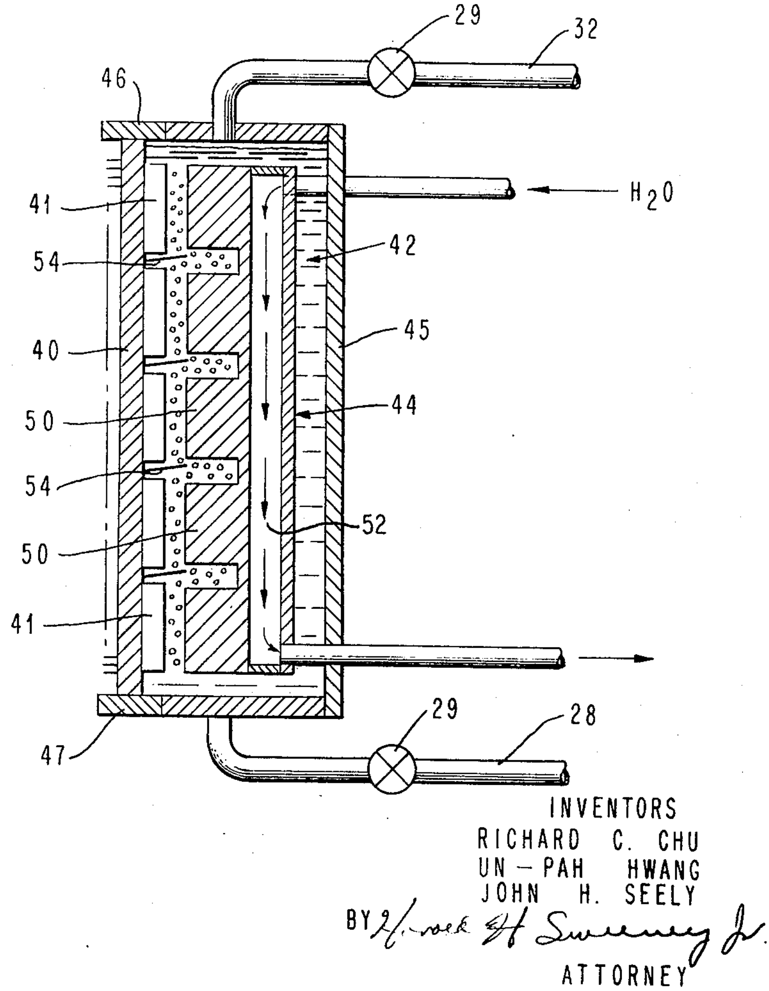
FIG. 2 is an enlarged vertical cross sectional view taken along line 2—2 of FIG. 1.

It can be seen from FIG. 2, that the fins 50 of the heat exchanger 44 are located fairly close to the electronic components 41 to be cooled. The fins 50, by means of the circulating water 52 through the heat exchanger 44, are maintained at a sub-cooled temperature, that is, a temperature below the saturation temperature of the low-boiling-point liquid. As the temperature of the electronic components 41 rises, the low-boiling-point liquid adjacent to the hotter surface of the component becomes heated and sets up convection currents within the low-boiling-point liquid. When the surface of the electronic component exceeds the saturation temperature of the low-boiling-point liquid, nucleate boiling takes place at the surface. This boiling consists of vapor bubbles forming in the liquid at the hot surface. The nucleate boiling at the surface sets up micro-convection currents which increase the heat removal from the hot surface of the components. The nucleate boiling bubbles rise and are essentially intercepted by deflectors 54 which are located above each electronic component 41. The deflectors 54 are arranged to deflect the nucleate boiling bubbles into the adjacent finned area of the heat exchanger 44. The vapor bubbles condense, upon contacting the cooler fins 50 of the heat exchanger 44. The condensing of the bubbles produces agitation of the liquid which causes convection currents providing a good heat exchange from the low-boiling-point liquid to the heat exchanger. Of course, there is some heat carried by the vapor of the boiling bubbles themselves which is transferred to the fins 50 of the heat exchanger 44 upon condensation. The deflectors 54 can be made of any appropriate material such as plastic and are arranged at an angle such that the bubbles will deflect into the desired fin area. The deflectors 54 provide an additional advantage in that they prevent the bubbles rising along the surface of the above located components where they form a vapor barrier which interferes with the heat transfer from that component to the low-boiling-point liquid. It will be appreciated that the heat generating components 41 are maintained at substantially a uniform temperature. As the temperature of any component increases above the saturation temperature of the low-boiling-point liquid, nucleate boiling takes place which maintains the temperature of the component at a substantially fixed temperature. As the temperature of the component increases, the nucleate boiling increases thus providing additional cooling as required. Of course, if the component continues to increase in temperature, the nucleate boiling continues until it reaches the point of critical heat flux which is the limitation of nucleate boiling.

The system described is capable of providing cooling by an immersion type arrangement which allows a more flexible packaging and which affords individual unit servicing without interrupting the operation of the rest of the system.

While the invention has been particularly shown and described with reference to a preferred embodiment thereof, it will be understood by those skilled in the art that various changes in form and detail may be made therein without departing from the spirit and scope of the invention.

What is claimed is:

1. An improved immersion cooling system for modularly packaged components comprising:
   - a common vessel containing a low-boiling-point liquid;
   - a plurality of modular units each containing an individual cooling chamber;
   - input conduit means connecting each of said individual cooling chambers to said common vessel;
   - output conduit means connecting each of said individual cooling chambers to said common vessel, said individual cooling chambers and said input conduit means being arranged with respect to the common vessel such that the liquid will flow from said vessel through said input conduit means into said individual cooling chambers by gravitational force, the output conduit means providing a vent path and liquid expansion path for said individual cooling chambers;
   - heat generating components located in each of said cooling chambers in heat exchange contact with said low-boling-point liquid so as to provide cooling;
   - a fluid cooled heat exchanger associated with each of said individual cooling chambers for removing heat from said low-boiling-point liquid so as to provide sufficient cooling to maintain said components substantially at a predetermined temperature.

2. An improved immersion cooling system according to claim 1, wherein said common vessel includes a one-way venting valve and a degassing means, said degassing means including a heater element within said low-boiling-point liquid so that the gas may be purged therefrom by raising the temperature of the liquid, said gas passing out of the vessel thru said one-way venting valve.

3. An improved immersion cooling system according to claim 1, wherein said common vessel is sealed, means for maintaining a constant pressure within said vessel.

4. An improved immersion cooling system according to claim 1, wherein said heat generating components are arranged in a vertical, two-dimensional array attached to the inside of a vertical wall of said cooling chamber and having electrical connections passing through said wall said heat exchanger being located adjacent and paralle to said vertical array of components, the components and heat exchanger being separated by said low-boiling-poin liquid within said individual cooling chamber.

5. An improved immersion cooling system according to claim 4, wherein nucleate boiling bubble deflectin means are located above each heat generating componen of each module in the array so that the boiling bubble rising from the underlying module are deflected towar the associated heat exchanger.

6. An improved immersion cooling system accordin to claim 1, wherein each of said first and second connecting means between each of said individual cooling chambers and said common vessel contains valve means adapte to shut off the flow of low-boiling-point liquid therebetween so that the modular units can be serviced withou affecting the operation or cooling of other modules in the array.

7. An improved immersion cooling system accordin to claim 3, wherein said means for maintaining a constan pressure within said vessel comprises a compressed ga source for maintaining a predetermined low pressure within said system thereby maintaining the temperature a which nucleate boiling bubbles start in the liquid.

References Cited

UNITED STATES PATENTS

| | | | |
|---|---|---|---|
| 2,274,781 | 3/1942 | Ensminger | 336—57 |
| 2,343,387 | 3/1944 | Sargent et al. | 165—131 X |
| 3,270,250 | 8/1966 | Davis | 317—100 |
| 3,406,244 | 10/1968 | Oktay | 174—15 |

FOREIGN PATENTS

| | | |
|---|---|---|
| 1,028,363 | 5/1966 | Great Britain. |

ROBERT A. O'LEARY, Primary Examiner

A. W. DAVIS, Jr., Assistant Examiner

U.S. Cl. X.R.

165—76, 138; 174—15; 317—100